No. 857,118. PATENTED JUNE 18, 1907.
E. H. SLAYBAUGH.
TRUCK BRAKE.
APPLICATION FILED AUG. 13, 1906.

Witnesses
Jos. J. Hosler
Minnie F. Anthony

Inventor
Eli H. Slaybaugh
By Harry Frease
Attorney

UNITED STATES PATENT OFFICE.

ELI H. SLAYBAUGH, OF ALLIANCE, OHIO, ASSIGNOR OF ONE-HALF TO HARRY B. GARDNER, OF ALLIANCE, OHIO.

TRUCK-BRAKE.

No. 857,118.  Specification of Letters Patent.  Patented June 18, 1907.

Application filed August 13, 1906. Serial No. 330,295.

*To all whom it may concern:*

Be it known that I, ELI H. SLAYBAUGH, a citizen of the United States, residing at Alliance, in the county of Mahoning and State of Ohio, have invented a new and useful Improvement in Truck-Brakes, of which the following is a specification.

The invention relates to trucks of the character generally used at railroad stations and other similar places where baggage and express packages are handled; and the object of the improvement is to provide a brake which can be set and locked by the handle of the truck when it is raised to a vertical position, but which is inoperative when the handle is in all other positions. This object is attained by the construction, mechanism and arrangement illustrated in the accompanying drawing, in which—

Figure 1:
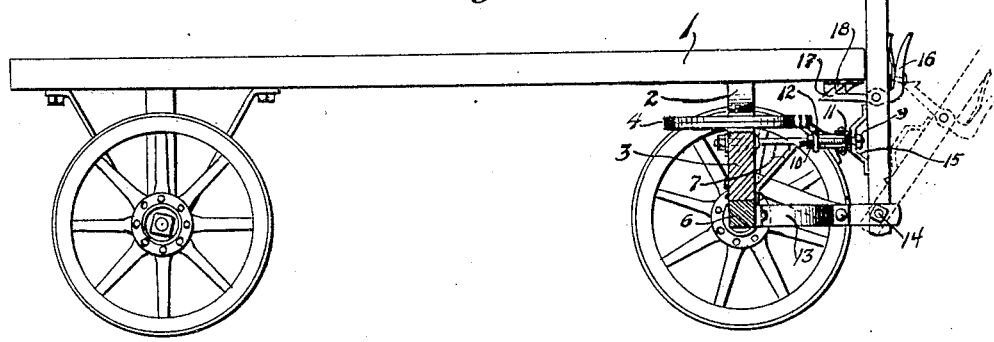
Figure 2:
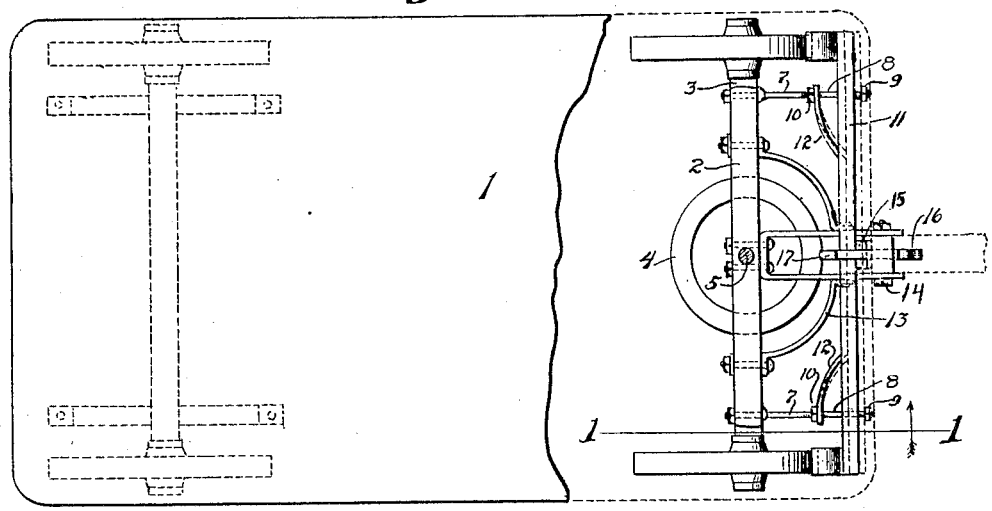
Figure 4:
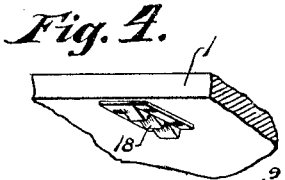
Figure 3:
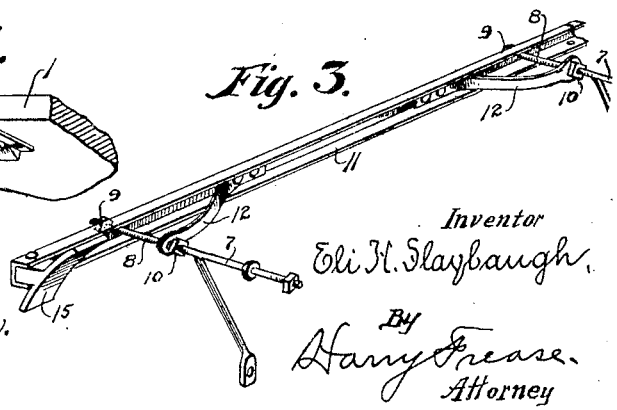

Figure 1 is a side elevation, partly in section, of a truck showing the handle in vertical position, and the brake set and locked; Fig. 2, a plan view of the truck showing parts in the same relation with the forward part of the platform broken away to disclose details of the brake; Fig. 3, a detached perspective view of the brake beam with attached parts; and Fig. 4, a detached perspective view showing the ratchet plate.

Similar numerals refer to similar parts throughout the drawing.

The forward end of the platform 1 of the truck rests on the usual transverse body bolster 2, which in turn rests on the transverse truck bolster 3 with the fifth wheel or turn table 4 intervening, these parts being connected and held together in the ordinary manner by means of the king bolt 5. The truck bolster is formed or attached on the axle 6, on the ends of which the forward wheels are journaled, in the usual manner. The brake brackets 7 are formed or attached, one on each side of the median line, on the forward side of the truck bolster and terminate in the longitudinally-disposed bars or guides 8, which may be provided at the forward end with the heads 9 preferably in the form of an adjustable nut, as shown, and at an interval from the end with the shoulder forming collars 10, preferably the adjustable nuts, as shown.

The brake beam 11 is mounted on the guides 8, the same being passed through suitable apertures in the beam, whereby the same is adapted to be moved or to slide directly forward and backward on the guides; and the springs 12 are preferably provided on the beam and are adapted to bear against the shoulder-nut of the guide whereby the beam is normally pressed and held forward against the heads thereof, in which normal relation of the parts the brake shoes are located adjacent to the wheels.

The handle bracket 13 is formed or attached on the forward side of the axle and the truck bolster, and the ordinary tongue or handle of the truck is pivoted as at 14 to this bracket so as to have a vertically oscillating movement. The butting bracket 15 is preferably provided on the truck handle, and also the spring resisted latch 16 having the ratchet detent 17 thereon, is preferably pivoted to the truck handle, and the detent is adapted to engage with the respective teeth of the ratchet plate 18, formed or located on the under side of the forward end of the platform.

The parts thus described are so proportioned and arranged that when the truck handle is brought to or near the vertical position the butting bracket impinges the brake beam and pushes it directly backward and thus presses the brake shoes against the peripheries of the adjacent wheels, and the brake thus set is automatically locked by the engagement of the ratchet detent with the teeth of the ratchet plate. After which, by releasing the handle latch, the handle is free to drop forward, and the brake shoes are automatically freed from their contact with the wheels by the action of the springs, which forces the brake beam forward on its guides.

It will be noted that by the braking and locking devices thus described, the brake shoes are free from any contact with the wheels when the truck handle is in all positions excepting at or near the vertical, so that the truck may be moved about and handled freely until it is desired to stop and hold the same in a particular position, whereupon it is only necessary to raise the truck handle upward, preferably with some vigor or force, and when it arrives at or near the vertical position the brake is set and locked substantially instantaneously with the truck handle pointing directly upward in a position to permit free access around the end of the truck;

and likewise, the brake is released substantially instantaneously just as soon as the truck handle is moved away from its vertical position. And it is evident that the particular locking device shown and described and the particular means shown and described for movably mounting the brake beam and the handle are not essential features of the invention.

What I claim as my invention, and desire to secure by Letters Patent, is—

1. In a truck, an axle with wheels, guides on the axle with a spring controlled brake beam slidably mounted thereon and having shoes normally adjacent to the wheels, a handle pivoted to the axle adapted when approximately in a vertical position to impinge the beam to bring the shoes against the wheels, and means for locking the parts in this relation.

2. In a truck, an axle with wheels, a spring controlled brake-beam movably mounted on the axle and having shoes normally adjacent to the wheels, an oscillatable handle connected with the axle and adapted when approximately in a vertical position to impinge the beam to bring the shoes against the wheels, and means for locking the parts in this relation.

In testimony whereof I have signed my name to this specification in the presence of two subscribing witnesses.

ELI H. SLAYBAUGH.

In presence of—
J. F. HOGAN,
W. E. CROFT.